Nov. 17, 1959  J. A. LANG  2,913,265
SHAFT CLAMP FOR HUB TYPE DEVICE
Filed Aug. 19, 1955

INVENTOR.
JOHN A. LANG
BY Nicholas J. Garofalo
ATTORNEY

United States Patent Office 2,913,265
Patented Nov. 17, 1959

2,913,265

SHAFT CLAMP FOR HUB TYPE DEVICE

John A. Lang, Union, N.J., assignor to Bendix Aviation Corporation, Teterboro, N.J., a corporation of Delaware Application August 19, 1955, Serial No. 529,416

10 Claims. (Cl. 287—52)

This invention pertains to means for securing a hub-type device, such as a gear, cam, or the like, upon a round shaft.

Difficulty is often experienced in holding gears and the like fast to a round shaft so that they will not slip. This difficulty is greater with highly polished shafts.

An object of this invention is, therefore, to provide practical and certain means for securing hub-type devices such as gears, cams and others, to round shafts in such manner that they will not slip thereon, even when the shaft is highly polished.

A further object of the invention is to provide clamping means for this purpose, accommodated in a transverse hole in the hub of the device.

The invention further lies in the particular construction of the securing means, in its component parts and in their general arrangement to produce the results intended.

The foregoing objects, as well as additional and more specific objects and advantages of this invention, will appear more fully hereinafter from a consideration of the detailed description which follows, taken together with the accompanying drawings wherein an embodiment of the invention is illustrated.

Figure 2:
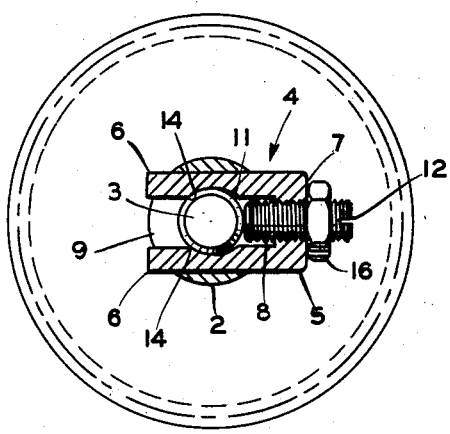
Fig. 2 is a section taken on line 2—2 of Fig. 1.
Figure 1:
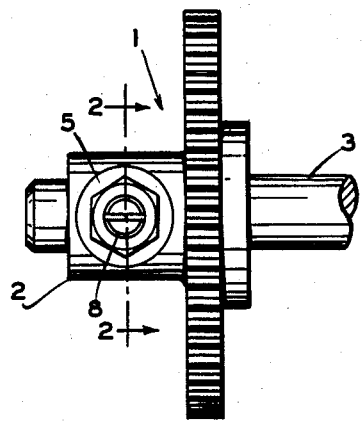
Fig. 1 is a side view of a hub-type device embodying the invention in association with a shaft.

In describing the invention in further detail, reference is directed to the drawings, now, particularly to Figs. 1 and 2, wherein there is shown a hub-type device 1 which may be a gear, cam, dial, pulley, or other article having an extended hub portion 2. The device is intended to be mounted upon a cylindrical shaft 3, passed axially through the hub portion 2. To prevent device 2 from slipping, sliding or rotating upon the shaft, novel fastening means is provided, generally indicated at 4. The fastening means comprises a U-formed cylindrical member 5, slotted down the middle to provide a pair of spaced parallel arms 6 integrally united at one end by an end or bridge piece 7. Axially through the center of the bridge piece is a threaded hole in which is threadedly engaged a bolt, 8.

The hub piece 2 of device 1 has a transverse bore 9 therethrough, at right angles to the longitudinal axis of the hub portion. The diameter of the bore is complementary to the outer diameter of member 5, permitting the latter to be inserted therethrough. The tolerance of member 5 in the device is preferably close, so as to be free of unnecessary play.

This transverse hole is of greater diameter than that of the shaft which is received axially in the hub. The slot or space between the arms 6 is of narrow dimension than the diameter of the shaft. The arms are, however, of thickened proportions, and have opposed arcuate cutouts or depressions 11. The latter have a common radius and are concentric with the shaft. The diameter of the cutouts 11 may be slightly greater than the shaft, as here.

The view in Fig. 2 shows the U clamp member in its clamped position.

In the assembly of the device, the arms of member 5 are inserted in the transverse hole of the hub. The shaft is then passed axially through the hub and between the complementary arcuate depressions of the arm elements 6. A screw driver is inserted in the slot 12 at the end of bolt 8, and the bolt is then threaded into the space between the arms 6 so as to limit against shaft 3. Subsequent continued threading inwardly of the bolt draws the U device outward upon the bolt, whereupon the left edges of the arcuate depressions in the arm elements are caused to limit against the surface of the shaft at points 14. This forces the free ends of the arms to expand outward or spread, and thereby limit their outer surfaces against the inner surface of the transverse bore 9; whereupon the U member, shaft, and hub piece become wedged fast to one another. The hub of device 1 becomes bound on the shaft and is unable, because of the fastening device, to slip, slide or rotate on the shaft. A lock nut 16 serves to lock the actuated position of bolt 8.

Figure 5:
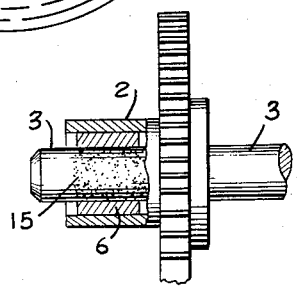
Fig. 5 is a longitudinal section of a modified form of the invention in which the related surface portion of the shaft has been roughed to facilitate the gripping of the shaft by the fastening elements of the hub-type device.

While shaft 3, shown here in Figs. 1 and 2, is highly polished, it can obviously be seen that the gripping possibility of the several elements with one another thereon could be further increased by roughing the related surface portion 15 of the shaft 3 on which the U-shaped arm elements 6 bear, as shown in the modified form of the invention of Fig. 5.

Figure 4:
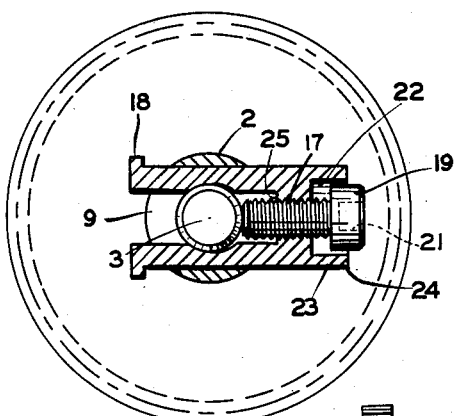
Fig. 4 is a section taken on the line 4—4 of Fig. 3.
Figure 3:
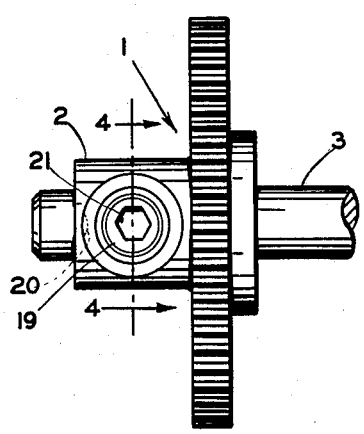
Fig. 3 is a view of a modified form of the invention embodied in a hub-type device.

In Figs. 3 and 4 is shown another modified form of the invention. In this form lips 18 at the free ends of the arms of the U member prevent withdrawal of the latter from the hub in one direction. A projection 20, formed in suitable manner in the wall of the hub cross hole after assembly of the U member therein, prevents withdrawal of the latter in the opposite direction. Lips 18 limit against the periphery of the hub when the U member is drawn in one direction; the projection 20 limits against the bridge piece 25 of the U member when the latter is drawn in the opposite direction. This structure provides the advantage of an assembled unit of the hub and U clamp, ready for reception of shaft 3.

The device in Figs. 3 and 4 is further modified as to the form of the bolt. The bolt 17 is provided with a headed end 19 which may be provided with a wrench slot 21. This headed end has a knurled surface, and it moves freely into a complementary socket 22 in a relatively thick end wall 23 of the U clamp as the bolt is threaded inwardly. It can be seen, that the clamp and bolt in this modified form may be locked together so as to prevent upsetting thereof, by crushing the extended surrounding material 24 of the socket into the knurled surface of the headed end of the bolt.

While the invention has been illustrated and described in detail as above, it is to be expressly understood that the invention is not limited thereto. Various changes can be made in the design and arrangement of the parts without departing from the spirit and scope of the invention, as the same will now be understood by those skilled in the art; and it is my intent, therefore, to claim the invention not only in the forms shown and described, but also in all such forms and modifications thereof as

What is claimed is:

1. In combination, a cylindrical shaft; a body normally slidable and rotatable on the shaft and including a transverse hole therethrough of a diameter greater than that of the shaft; a clamp member having a pair of spaced parallel arms joined together at one end and received in the transverse hole, the arms including a pair of interior wells complementary to the surface of the shaft; and means carried by said clamp member and bearing upon said shaft for drawing the clamp member in an outward direction to wedge the arms of the clamp tightly between the surface of the shaft and the wall of the transverse hole, whereby the body member is caused to be held fast to the shaft.

2. In combination, a cylindrical shaft; a body normally slidable and rotatable on the shaft and having a transverse hole therethrough at right angles to the longitudinal axis of the shaft, the hole being of greater diameter than the shaft; a clamp having a pair of spaced expandable parallel arms joined together by a wall at one end and received closely through the transverse hole, the clamp including a pair of opposed interior arcuate cutouts complementary to the surface of the shaft; and means carried by said clamp and bearing upon said shaft for drawing the arms of the clamp in a direction wherein the radial center of the cutouts will be eccentric to the radial center of the shaft and, as a consequence, causing the arms to expand and to limit tightly on their outer surface against the wall of the transverse hole and on their undersurface tightly against the surface of the shaft.

3. In combination, a cylindrical shaft; a body member slidable and rotatable on the shaft and having a transverse hole therethrough defined by a wall surface; a clamp received through said transverse hole in the body member and having a pair of opposed parallel arms between which the shaft is axially received in the body member, said shaft having a surface on which said opposed parallel arms bear, means carried by said clamp and bearing upon said shaft for drawing the arms in a particular direction over the shaft surface, and means for wedging the arms of said clamp tightly between the wall surface of the transverse hole and the surface of the shaft as they are being so drawn.

4. In the combination as in claim 3, wherein means is provided for locking the clamp in the wedged position of the arms relative to the shaft surface and to the wall surface of the transverse hole.

5. In the combination as in claim 3, wherein the parallel arms are joined at one end by a transverse wall, the means for drawing the arms over the shaft surface comprises a screw member threadable through the said wall and bearing at an inner end against the side of the shaft, and the means for wedging the arms is provided by a pair of opposed arcuate cutout portions in the inner surfaces of the arms which are complementary to the surface of the shaft and by an end portion of each arm adjacent each cutout portion adapted to wedge between the surface of the shaft and the wall surface of the transverse hole as the arms are drawn in the said particular direction.

6. In the combination as in claim 3, wherein the surface of the shaft is roughened to increase the hold of the wedged elements against one another.

7. A shaft clamp comprising: a cylindrical member slotted through one end and providing a pair of opposed flexible parallel thickened arms, the arms including a pair of opposed arcuate cutout sections adapted to receive therebetween a cylindrical shaft having a surface complementary to that of the cutout sections; a body member having a hole therethrough for closely receiving the shaft therethrough, and also having another hole therethrough transverse to the first-mentioned hole and adapted to receive the cylindrical member closely therein; a screw member threadable axially through an end of the cylindrical member said screw member bearing against the shaft and serving to draw the cylindrical member transversely over the shaft to effect both a slight expansion of the free ends of the arms and consequent wedging of the arms between the shaft and the wall of the bore of the body member as the cutout sections of the arms are drawn angularly up over the surface of the shaft.

8. The combination of a device including an axially extending hub portion for receiving axially therein a cylindrical shaft, said hub having a hole therein extending transverse to the shaft, and means for clamping the hub portion fast to the shaft wherein the latter means comprises a cylindrical member receivable through said hole transversely of the hub portion and at right angles to its longitudinal axis, the cylindrical member being slotted through one end and providing a pair of arms each including a cutout section in its inner face in opposed relation to one another, concentric to and complementary to the surface of the shaft, and a screw member axially threadable through the opposite end of the cylindrical member, said screw member bearing at an inner end thereof upon the shaft so as to draw said opposite end of the cylindrical member outward on said screw member in such a manner as to effect movement of the arms slightly over the shaft to bring the cutout portions in eccentric relation to the longitudinal axis of the shaft.

9. In the combination as in claim 8, wherein the screw member includes at an outer end thereof a slot for accommodating a driving tool, and a nut for locking the screw member in the driven position thereof.

10. In combination, a cylindrical shaft member, a rotary member having a hub piece formed with an axial hole for the close reception therethrough of the shaft member and formed with a lateral hole therethrough defined by a wall surface, a clamp member slidable in the lateral hole and having an axial hole alignable for reception of the shaft member, means normally preventing transverse withdrawal of the clamp from the hole, and means carried by the clamp member and bearing upon the shaft member for drawing the clamp member into wedged engagement with the wall surface of the lateral hole and with the shaft member.

References Cited in the file of this patent

UNITED STATES PATENTS

| | | |
|---|---|---|
| 231,688 | Spencer | Aug. 31, 1880 |
| 1,436,032 | Greer | Nov. 21, 1922 |
| 2,435,764 | Wessel | Feb. 10, 1948 |